United States Patent Office 3,379,722
Patented Apr. 23, 1968

3,379,722
17-CYCLIC KETALS OF 17-OXO-3-ALKOXYESTRAPOLYENES
Andrew John Manson and Donald K. Phillips, North Greenbush, N.Y., assignors to Sterling Drug Inc., New York, N.Y., a corporation of Delaware
No Drawing. Filed June 7, 1965, Ser. No. 462,044
7 Claims. (Cl. 260—239.55)

ABSTRACT OF THE DISCLOSURE 17-cyclic ketals of 17-oxo-3-lower-alkoxy-1,3,5(10),6-estratetraenes and -1,3,5(10),6,8-estrapentaenes, optionally halogenated in the 16-position, and having hypocholesteremic and estrogenic activities, are prepared by reacting the corresponding 17-oxo compounds with the appropriate alkylenediol or sulfur analog thereof.

---

This invention relates to new aromatic steroids and in particular is concerned with 3-lower-alkoxy-1,3,5(10),6-estratetraenes and 3-lower-alkoxy-1,3,5(10),6,8-estrapentaenes having in the 17-position a cyclic ketal or cyclic thioketal group.

The compounds of the invention have the following general formulas:

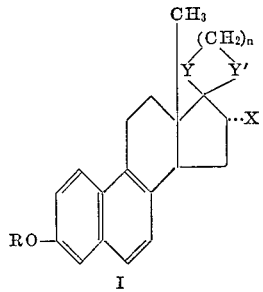 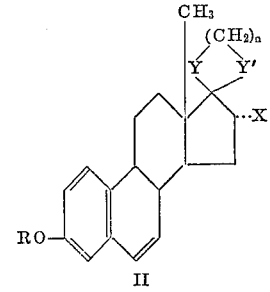

wherein R is lower-alkyl, X is hydrogen or halogen, Y and Y' are oxygen or sulfur, and $n$ is 2 or 3.

In the above Formulas I and II, R represents lower-alkyl and as such stands for an alkyl group having from one to about six carbon atoms, including methyl, ethyl, propyl, isopropyl, butyl, tertiary-butyl, amyl, hexyl and the like.

In the above Formulas I and II, X represents halogen, including any of the four halogens, fluorine, chlorine, bromine or iodine.

The compounds of the invention are prepared by reacting the corresponding 17-oxo compounds of formulas

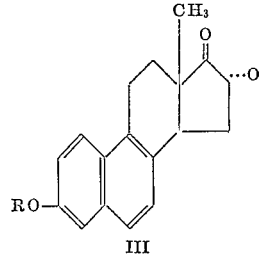 or 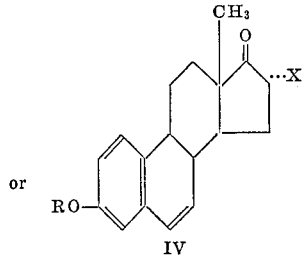

with a compound of the formula

H—Y—(CH$_2$)$_n$—Y'—H

R, X, Y, Y' and $n$ having the meanings given hereinabove. The reaction takes place in the presence of an acid catalyst with means for removing the water formed in the reaction. The starting materials can be either optically-active forms derived from natural sources, or optically-inactive (racemic) forms derived by total synthesis.

The intermediates of Formulas III and IV where X is chlorine or bromine are novel compounds and also within the purview of the invention. They are prepared by halogenation of the 17-enol acetates of equilenin lower-alkyl ether or 6-dehydroestrone lower-alkyl ether.

The structures of the compounds of the invention were established by the modes of preparation, by elementary analyses, and by their chemical and physical properties, including their ultraviolet, infrared and NMR spectra, and their behavior in thin-layer chromatography.

Biological evaluation of the compounds of Formulas I, II, III and IV has shown that they possess hypocholesteremic and estrogenic activities.

The following examples will further illustrate the invention without the latter being limited thereby.

EXAMPLE 1

3-methoxy-1,3,5(10),6,8-estrapentaen-17-one ethylenediol ketal [I; R is CH$_3$, X is H, Y and Y' are O, n=2]

A mixture of 5.00 g. of dl-equilenin methyl ether, 15 ml. of ethylene glycol, 0.500 g. of sulfosalicylic acid and 125 ml. of toluene was stirred vigorously and distilled into a water separator over a period of thirty hours. The mixture was diluted with benzene, washed with 5% sodium bicarbonate solution, water, and saturated sodium chloride solution, filtered through anhydrous sodium sulfate, and concentrated to remove the volatile solvent. The residue was chromatographed on activated magnesium silicate (Florisil), and the column was eluted with benzene. The product was recrystallized from a cyclohexane-hexane mixture containing a few drops of pyridine to give 3 - methoxy-1,3,5(10),6,8-estrapentaen-17-one ethylenediol ketal, M.P. 122.4–123.8° C. (corr.); ultraviolet maxima at 230 mµ ($\epsilon$=52,100), 255 (6,910), 264 (7,460), 279 (5,050), 289 (4,080), 305 (2,140), 322 (1,780), 331 (1,670), and 337 (2,230); infrared absorption at 3.33, 3.45, 6.19, 6.27, 6.38, 6.69, 6.74, 6.81, 6.91 and 6.99µ.

3 - methoxy - 1,3,5(10),6,8-estrapentaen-17-one ethylenediol ketal was found to lower serum cholesterol by 33% at a dose level of 4.2 mg./kg./day when administered orally to rats. The compound was found to be stimulatory as an estrogen at 20.0 mg./kg. as measured by the uterine growth in rats.

By replacing the dl-equilenin methyl ether in the foregoing preparation by a molar equivalent amount of equilenin isopropyl ether or equilenin n-hexyl ether there can be obtained, respectively, 3-isopropoxy-1,3,5(10),6,8-estrapentaen-17-one ethylenediol ketal or 3-(n-hexyloxy)-1,3,5(10),6,8-estrapentaen-17-one ethylenediol ketal.

EXAMPLE 2 d-3-methoxy-1,3,5(10),6,8-estrapentaen-17-one ethylenediol ketal was prepared from d-equilenin methyl ether according to the procedure described above in Example 1. The product was recrystallized first from benzene-hexane and then from ethyl acetate-ethanol to give d-3-methoxy-1,3,5(10),6,8-estrapentaen-17-one ethylenediol ketal in the form of colorless rods, M.P. 100.6–134.8° C. (corr.), $[\alpha]_D^{25}=-49°$ (1% in chloroform); ultraviolet maxima at 229 mµ ($\epsilon$=62,300), 258 (3,500), 268 (4,700), 279 (5,100), 289 (3,500), 311 (1,100), 332 (1,900) and 337 (2,600); infrared absorption at 3.28, 3.40, 3.47, 6.17, 6.25, 6.35, 6.62, 6.73, 6.83 and 6.96µ.

EXAMPLE 3 dl-3-methoxy-1,3,5(10),6,8-estrapentaen-17-one ethylenedithiol ketal [I; R is $CH_3$, X is H, Y and Y' are S, $n=2$]

A mixture of 3.00 g. of dl-equilenin methyl ether, 3 ml. of 1,2-ethanedithiol, 3 ml. of boron trifluoride etherate and 75 ml. of glacial acetic acid was stirred at room temperature for ten minutes and allowed to stand for sixty-four hours. The reaction mixture was diluted with 25 ml. of water and the solid material was collected by filtration, washed with water and dried. The solid product was dissolved in benzene, filtered through 60 g. of Florisil and concentrated. The residue was recrystallized twice from benzene to give dl-3-methoxy-1,3,5(10),6,8-estrapentaen-17-one ethylenedithiol ketal, M.P. 222.0–223.2° C.; ultraviolet maxima at 233 m$\mu$ ($\epsilon$=65,700), 258 (4,400), 268 (5,280), 278 (5,330), 289 (3,470), 311 (1,100), 322 (2,050), 331 (1,910) and 337 (2,550); infrared absorption at 3.35, 3.45–3.55, 6.21, 6.29, 6.67, 6.76 and 6.86$\mu$.

By replacing the 1,2-ethanedithiol in the foregoing preparation by a molar equivalent amount of 1,3-propanedithiol there can be obtained dl-3-methoxy-1,3,5(10),6,8-estrapentaen-17-one 1,3-propylenedithiol ketal.

EXAMPLE 4 dl-3-methoxy-1,3,5(10),6,8 - estrapentaen-17-one 2-mercaptoethanol ketal [I; R is $CH_3$, X is H, Y is O, Y' is S, $n=2$]

A mixture of 4.00 g. of dl-equilenin methyl ether, 4.00 ml. of 2-mercaptoethanol, 200 mg. of p-toluenesulfonic acid and 160 ml. of benzene was refluxed under a water separator for three hours and kept at room temperature for fifteen hours. The product was separated and chromatographed on a column of 500 g. of silica gel. The column was eluted with the solvent series pentane-benzene-ether. Benzene alone brought out the desired product which was recrystallized several times from benzene-hexane to give dl-3-methoxy-1,3,5(10),6,8-estrapentaen-17-one 2-mercaptoethanol ketal in the form of colorless rods, M.P. 131.8–134.6° C. (corr.); ultraviolet maxima at 231m$\mu$ ($\epsilon$=60,800), 258 (3,640), 268 (4,690), 279 (4,950), 289 (3,360), 310 (1,040), 323 (1,980), 331 (1,870) and 338 (2,500).

EXAMPLE 5 dl-3-methoxy-1,3,5(10),6,8-estrapentaen - 17 - one 1,3-propanediol ketal [I; R is $CH_3$, X is H, Y and Y' are O, $n=3$] was prepared from 3.00 g. of dl-equilenin methyl ether, 0.200 g. of sulfosalicyclic acid, 10 ml. of propane-1,3-diol and 150 ml. of benzene according to the procedure described above in Example 1. The product was chromatographed on 100 g. of Florisil, eluted with benzene-hexane 1:1 and recrystallized repeatedly from benzene-hexane containing a trace of pyridine to give dl-3-methoxy-1,3,5(10),6,8-estrapentaen-17-one 1,3-propanediol ketal, M.P. 152.6–153.6° C. (corr.); ultraviolet maxima at 230 m$\mu$ ($\epsilon$=64,500), 257 (4,650), 267 (5,700), 278 (5,700), 289 (3,820), 309 (1,260), 322 (2,120), 331 (2,000) and 337 (2,670).

EXAMPLE 6

3-methoxy-1,3,5(10),6 - estratetraen-17-one ethylenediol ketal [II; R is $CH_3$, X is H, Y and Y' are O, $n=2$] was prepared from 4.00 g. of 6-dehydroestrone methyl ether and ethylene glycol according to the procedure described above in Example 1. The product was recrystallized first from ether and then from benzene-methanol to give 3-methoxy-1,3,5(10),6-estratetraen-17-one ethylenediol ketal, M.P. 75.2–76.4° C. (corr.); $[\alpha]_D^{25}$=–226.1° (1% in chloroform); ultraviolet maxima at 221 m$\mu$ ($\epsilon$=28,700), 262 (7,500), 270 (6,100), 303 (2,600) and 310 (2,150); infrared absorption at 3.29, 3.49, 3.50, 3.59, 6.14, 6.25, 6.37, 6.68 and 6.84$\mu$.

EXAMPLE 7

(a) dl - 17 - acetoxy-3-methoxy-1,3,5(10),6,8,16-estrahexaene: A mixture of 4.00 g. of dl-equilenin methyl ether (M.P. 185–190° C.), 0.45 g. of p-toluenesulfonic acid and 80 ml. of isopropenyl acetate was heated slowly to boiling and distilled slowly over a period of seven hours. The mixture was then kept overnight at room temperature and distilled for seven hours longer. The reaction mixture was cooled, and after ether was added it was washed with 5% sodium bicarbonate solution and water, and concentrated in vacuo. The residue was recrystallized first from ether and then from ethyl acetate to give 1.90 g. of dl-17-acetoxy-3-methoxy-1,3,5(10),6,8,16-estrahexaene in the form of pale peach needles, M.P. 165.2–166.6° C. (corr.). An additional 0.99 g. of material was obtained by chromatography of the mother liquors on Florisil and elution with cyclohexane; ultraviolet maxima at 231 m$\mu$ ($\epsilon$=63,400), 258 (3,640), 268 (4,750), 278 (5,260), 290 (3,700), 323 (2,260), 338 (2,800), 311 (1,200) and 333 (2,220); infrared absorption at 3.31, 3.44, 3.55 and 5.69$\mu$.

(b) dl-16$\alpha$-bromo-3-methoxy-1,3,5(10),6,8 - estrapentaen-17-one [III; R is $CH_3$, X is Br]: To a suspension of 3.90 g. of powdered anhydrous potassium carbonate in a solution of 6.00 g. of dl-17-acetoxy-3-methoxy-1,3,5(10),6,8,16-estrahexane in 600 ml. of carbon tetrachloride at 2–4° C. was added dropwise with stirring during fifteen minutes a solution of 3.30 g. of bromine in 78 ml. of carbon tetrachloride. The reaction mixture was poured into 500 ml. of water containing a small amount of sodium bisulfite. The layers were separated, the aqueous layer extracted with chloroform, and the combined organic layers washed with sodium chloride solution, filtered through anhydrous sodium sulfate and concentrated in vacuo. The residue was recrystallized repeatedly from a chloroform-hexane mixture to give dl-16$\alpha$-bromo-3-methoxy-1,3,5(10),6,8-estrapentaen-17-one in the form of light orange prisms, M.P. 193.6–195.0° C. (corr.); ultraviolet maxima at 269 m$\mu$ ($\epsilon$=5,700), 280 (5,680), 291 (3,790), 311 (1,250), 323 (2,120), 332 (1,990) and 338 (2,600).

(c) dl-16$\alpha$-bromo - 3 - methoxy - 1,3,5(10),6,8 - estrapentaene ethylenediol ketal [I; R is $CH_3$, X is Br, Y and Y' are O, $n=2$] was prepared from dl-16$\alpha$-bromo-3-methoxy-1,3,5(10),6,8-estrapentaen-17-one and ethylene glycol according to the procedure described above in Example 1. The reaction mixture was heated for 140 hours. The product was obtained in the form of fine, colorless needles, M.P. 188.6–189.4° C. (corr.) when recrystallized from a benzene-hexane mixture; ultraviolet maxima at 230 m$\mu$ ($\epsilon$=66,000), 259 (3,790), 268 (4,960), 278 (5,360), 289 (3,600), 310 (1,070), 322 (2,040), 332 (1,950) and 337 (2,580); infrared absorption at 3.44, 3.51, 6.19, 6.27, 6.37, 6.65, 6.74 and 6.88$\mu$.

EXAMPLE 8

(a) dl-16$\alpha$-chloro - 3 - methoxy - 1,3,5(10),6,8-estrapentaen-17-one [III; R is $CH_3$, X is Cl]: A suspension of 14 g. of anhydrous postassium carbonate in a solution of 6.59 g. of dl-17-acetoxy-3-methoxy-1,3,5(10),6,8,16-estrahexaene in 1000 ml. of carbon tetrachloride at 12° C. was treated during thirty minutes with 55 ml. of 0.37 M chlorine in carbon tetrachloride. There was then added a solution of 6.4 g. of sodium bisulfite in 50 ml. of water. The layers were separated, the aqueous layer extracted with chloroform, and the combined organic layers concentrated in vacuo. The residue was recrystallized successively from carbon tetrachloride, acetone and ethyl acetate to give dl-16$\alpha$-chloro-3-methoxy-1,3,5(10),6,8-estrapentaen-17-one in the form of cream-colored needles, M.P. 198.0–202.0° C. (corr.); ultraviolet maxima at 231 m$\mu$ ($\epsilon$=59,400), 268 (5,140), 278 (5,270), 289 (3,540), 310 (1,070), 322 (1,920), 331 (1,770) and 336 (2,380); infrared absorption at 3.41, 5.67, 5.75, 6.17, 6.25, 6.35, 6.63, 6.71, 6.86 and 8.05$\mu$.

(b) dl - 16α - chloro - 3 - methoxy-1,3,5(10),6,8-estrapentaen-17-one ethylenediol ketal [I; R is CH₃, X is Cl, Y and Y' are O, n=2] can be prepared from dl-16α-chloro-3-methoxy-1,3,5(10),6,8-estrapentaen - 17 - one and ethylene glycol according to the procedure described above in Example 1.

EXAMPLE 9

(a) 17 - acetoxy - 3 - methoxy - 1,3,5(10),6,16-estrapentaene was prepared from 4.0 g. of 6-dehydroestrone methyl ether, 0.20 g. of sulfosalicylic acid and 200 ml. of isopropenyl acetate according to the procedure described above in Example 7, part (a). The product was chromatographed and recrystallized from ether and from ethyl acetate to give 17-acetoxy-3-methoxy-1,3,5(10), 6,16-estrapentaene in the form of colorless rods, M.P. 132.6–133.5° C. (corr.), [α]$_D^{25}$=—160.4° (1% in chloroform); ultraviolet maxima at 221 mμ (ε=30,400), 261 (7,350), 269 (6,000), 302 (2,500) and 310 (2,050); infrared absorption at 3.25, 3.30, 3.35, 3.40, 3.49, 5.67, 6.13, 6.22, 6.36, 6.68, 6.85 and 6.97μ.

(b) 16α-chloro - 3 - methoxy - 1,3,5(10),6-estratetraen-17-one [IV; R is CH₃, X is Cl] was prepared by chlorination of 17-acetoxy - 3 - methoxy - 1,3,5(10),6,16-estrapentaene according to the procedure described above in Example 7, part (b). The product was recrystallized from methanol and from acetone to give 16α-chloro-3-methoxy - 1,3,5(10),6 - estratetraen - 17 - one in the form of colorless flakes, M.P. 193.0–196.0° C. (corr.), [α]$_D^{25}$=—114.2° (1% in chloroform); ultraviolet maxima at 221 mμ (ε=29,600), 262 (7,600), 270 (6,200), 303 (2,500), 337 (110) and 310 (2,200).

(c) 16α - chloro - 3 - methoxy - 1,3,5(10),6-estratetraen-17-one ethylenediol ketal [II; R is CH₃, X is Cl, Y and Y' are O, n=2] can be prepared from 16α-chloro-3-methoxy-1,3,5(10),6-estratetraen-17-one and ethylene glycol according to the procedure described above in Example 1.

By replacing the bromine or chlorine in Examples 7(b) or 8(a) by iodine there can be obtained dl-16α-iodo-3-methoxy-1,3,5(10),6,8-estrapentaen-17-one, which can then be converted to its ethylene glycol ketal.

dl-16α-iodo - 3 - methoxy - 1,3,5(10),6,8-estrapentaen-17-one when heated with silver fluoride in acetonitrile solution is converted to dl - 16α - fluoro - 3 - methoxy-1,3,5(10),6,8-estrapentaen-17-one, which can then be converted to its ethylene glycol ketal.

We claim:
1. A compound of the formula

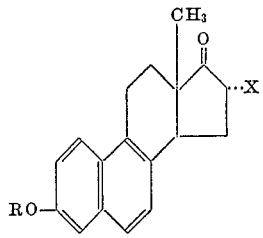

wherein R is lower-alkyl, Y is oxygen or sulfur, Y' is oxygen, and n is 2 or 3.

2. 3 - methoxy - 1,3,5(10),6,8 - estrapentaen - 17 - one ethylenediol ketal.

3. 3 - methoxy - 1,3,5(10),6,8 - estrapentaen - 17 - one 2-mercaptoethanol ketal.

4. 3 - methoxy - 1,3,5(10),6,8 - estrapentaen - 17 - one 1,3-propanediol ketal.

5. A compound of the formula wherein R is lower-alkyl and X is halogen.

6. 3 - methoxy-16α-bromo-1,3,5(10),6,8-estrapentaen-17-one.

7. 3 - methoxy-16α-chloro-1,3,5(10),6,8-estrapentaen-17-one.

References Cited

UNITED STATES PATENTS 3,189,605    6/1965    Smith et al. _____ 260—239.55
3,189,625    6/1965    Russell et al. _____ 260—239.55

LEWIS GOTTS, *Primary Examiner.*

JOHNNIE BROWN, *Examiner.*

UNITED STATES PATENT OFFICE
CERTIFICATE OF CORRECTION

Patent No. 3,379,722                                April 23, 1968

Andrew John Manson et al.

It is hereby certified that error appears in the above numbered patent requiring correction and that the said Letters Patent should read as corrected below.

Column 1, lines 53 to 63, formula III should appear as shown below:

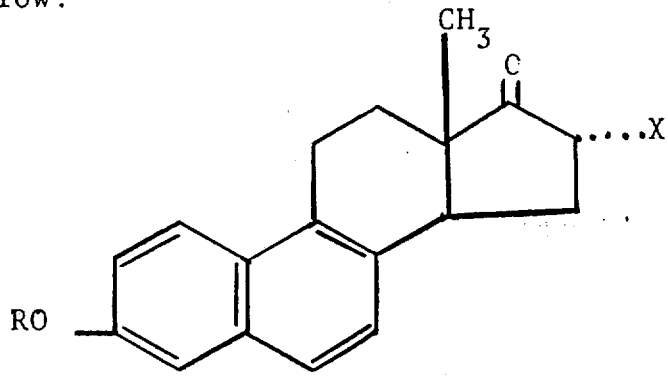

Signed and sealed this 23rd day of September 1969.

(SEAL)
Attest:

EDWARD M. FLETCHER, JR.          WILLIAM E. SCHUYLER, JR.
Attesting Officer                Commissioner of Patents